(No Model.)
E. H. PECK.
PLUNGER FOR GLASS PRESSES.
No. 246,972. Patented Sept. 13, 1881.
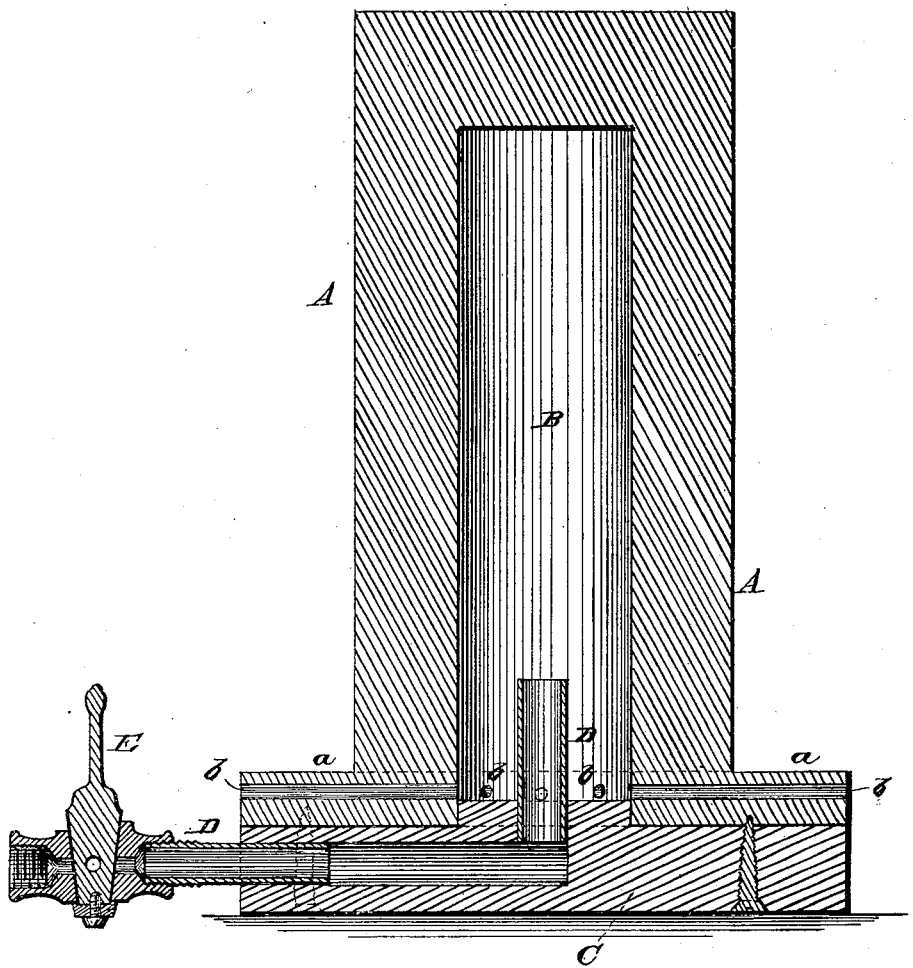
WITNESSES
INVENTOR

UNITED STATES PATENT OFFICE.

EUGENE H. PECK, OF MERIDEN, CONNECTICUT.

PLUNGER FOR GLASS-PRESSES.

SPECIFICATION forming part of Letters Patent No. 246,972, dated September 13, 1881.

Application filed June 30, 1881. (No model.)

*To all whom it may concern:*

Be it known that I, E. H. PECK, of Meriden, in the county of New Haven and State of Connecticut, have invented certain new and useful Improvements in Plungers for Glass-Presses; and I do hereby declare that the following is a full, clear, and exact description of the invention, which will enable others skilled in the art to which it appertains to make and use the same, reference being had to the accompanying drawing, which forms a part of this specification.

My invention relates to plungers of glass-molds employed in pressing glass; and the novelty consists in the construction, arrangement, and adaptation of parts, as will be more fully hereinafter set forth, and specifically pointed out in the claim.

It has been discovered that in the art of pressing or molding glass the plunger is liable to become heated owing to its frequent contact with the material, and in such cases the plunger has to be cooled in some manner, causing loss of time and inconvenience.

The object of this invention is to overcome this difficulty; and to this end the invention consists, essentially, in a manner and means for producing and preserving a current of circulating cold air or water through the plunger when in use, reference being had to the accompanying drawing, which forms a part of this specification, and which represents a longitudinal central section.

To enable others skilled in the art to make and use my improved plunger, I will describe the construction and mode of operation of the same, and to that end refer to the figure, in which—

A represents the plunger-case having a collar, a, and B represents the internal chamber. Upon the collar a is secured, so as to make an air-tight joint, a cap, C.

D represents a pipe-connection, which leads from any suitable blast-producer or blower to the chamber B, the walls of which are perforated at b, as shown. A thumb-cock, E, controls the inflow of cold air or water which is deposited near the bottom of the recess B, passes thence upward, and makes its exit through the holes b to the outer air.

I am aware that water and air have heretofore been used to cool the plungers of glass-presses, and such I do not claim as my invention, which consists, essentially, in the herein-described means for producing and preserving a current of cold air or water.

Having thus described my invention, what I claim as new, and desire to secure by Letters Patent of the United States, is—

As an improvement in plungers, the combination, with the body A, having collar or flange a, through which radiate perforations b, of the detachable cap C, having pipe-connection D, provided with thumb-cock E, all combined and operating substantially as and for the purpose herein shown and specified.

In testimony that I claim the foregoing as my own I have hereto affixed my signature in the presence of two witnesses.

EUGENE H. PECK.

Witnesses:
WILBUR F. DAVIS,
CHAS. E. CLARK.